July 24, 1956     W. H. CRAWFORD     2,755,910
CONVEYOR SYSTEM FOR CHECK STANDS
Filed Jan. 5, 1953
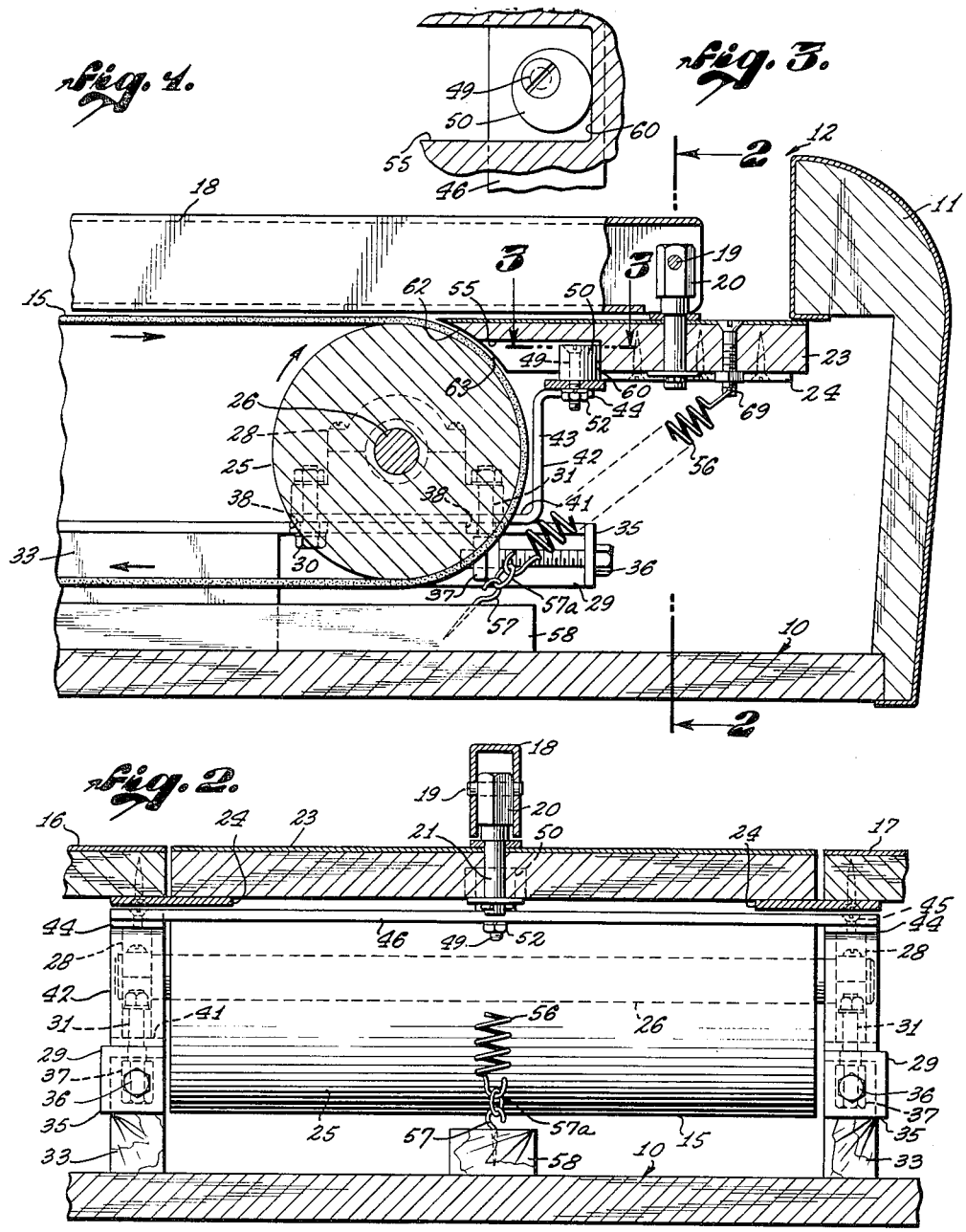
WAYLAND H. CRAWFORD,
INVENTOR.
BY 
ATTORNEY.

United States Patent Office 2,755,910
Patented July 24, 1956

2,755,910
CONVEYOR SYSTEM FOR CHECK STANDS

Wayland H. Crawford, San Gabriel, Calif., assignor to Modern Village Stores, Inc., a corporation of California Application January 5, 1953, Serial No. 329,654

9 Claims. (Cl. 198—65)

This invention relates to improvements in conveyor systems, and more particularly to improvements in checkstands of the character disclosed and claimed in my Patent No. 2,723,728 and in my prior patent application Serial No. 294,120, filed June 18, 1952. Such checkstands are employed for facilitating checking of grocery or other items purchased by customers and computing the total amount of each purchase, and delivering the checked articles to a wrapping or sacking station at one end of the checkstand.

In my patent and prior patent application referred to above, there is shown a checkstand embodying a driven conveyor belt which functions to feed successively a plurality of items to be checked from an unloading station, past a cashier or checking station, and thence to a delivery or sacking station where the articles are placed in bags, boxes or other containers. The checkstand also includes a pivoted diverting arm at the discharge end of the conveyor belt for selectively or alternately guiding the checked items laterally in either direction at the delivery station or platform so as to segregate the articles purchased by different customers whose orders are checked successively.

The conveyor belt employed in the checkstand passes around pulleys and is subject to stretching with usage and age. Consequently, one of the belt pulleys is so mounted that it may be readily adjusted longitudinally of the belt to take up slack in the belt and thus maintain efficient operation. In accordance with the invention disclosed in my application Serial No. 294,120, the checkstand includes a movable table section adjacent the adjustably positioned pulley to facilitate adjustment of the pulley position to tighten the conveyor belt without varying the gap between the belt and the adjacent edge of the table section. The structure embodies a roller carried by the movable table section and engaging against the curved portion of the belt to maintain the edge of the movable table section at a predetermined distance from the belt, a coil spring serving to hold the roller against the curved portion of the belt extending around the pulley. The table section is slidably arranged so that the gap between its inner end and the conveyor belt is enlarged for safety purposes in the event that objects enter the gap.

While my prior checkstand conveyor system is quite efficient in use, it has been determined that loose food material, such as sugar, salt, flour, lettuce leaves, etc., may adhere to the belt. In my prior structure, the material-laden belt in moving across the roller means displaces the latter and thus acts to force the table section forwardly, such movement of the table section increasing the gap between its edge and the belt. Such widening of the clearance gap creates a hazardous condition since it may allow insertion and wedging of the finger tips, coins or other objects in the gap.

It is therefore an object of the present invention to obviate the difficulties and deficiencies of my prior checkstands by providing an improved structure in which the table section is adjustable toward and away from the belt to maintain a gap of minimum width between the inner edge of the table section and the curved portion of the belt, the table section being yieldingly maintained in its adjusted position by spring means.

Another object of the invention is to provide a checkstand, of the character referred to, embodying stop means against which a shoulder of the table section is maintained by the spring means, the stop means being fixedly mounted relative to the pulley and belt and thus movable with the pulley when the latter is adjusted to tighten the belt.

Another object is to provide a stop means which is carried by a bracket secured to the bearing means for the belt pulley, the stop means being in the nature of an eccentric disc which is readily rotated to effect initial adjustment of the table section relative to the belt so as to establish the desired clearance gap therebetween. By this improved construction, the width of the gap normally is maintained constant, that is, equal to the initial setting, this desirable condition being due to the fact that the belt, stop means and the table section provide, in effect, a unitary structure. However, the table section is freely slidable in a direction away from the belt to automatically enlarge the gap in the event of insertion of any object in the gap, so as to avoid wedging of the object which might result in injury to a person and damage to the conveyor system.

A further object is to provide a conveyor system of the type indicated in which the improved gap-adjusting means is simpler in construction, more economical to produce and to apply to existing, as well as new, checkstands, and one which is more practical and efficient than similar devices heretofore employed for like purposes.

My invention possesses numerous objects, features and advantages, some of which together with the foregoing will be set forth in the following description of a single embodiment thereof. Though only one embodiment of my invention is described herein in detail, it is to be understood that my invention is not limited thereto but may be embodied in other forms within the scope of the appended claims.

In the drawing, wherein like reference characters indicate like elements throughout the several views:

Figure 1 is a longitudinal sectional view of the delivery end of a checkstand;

Fig. 2 is a cross-sectional view, taken on line 2—2 of Fig. 1;

Fig. 3 is a fragmentary sectional plan view, taken on line 3—3 of Fig. 1; and

Fig. 4 is a perspective view of the bracket and eccentric adjusting disc employed in the present improved structure.

Referring to the drawing in detail, the conveyor means illustrated therein, while adapted for use in connection with various apparatus, preferably is employed in a checkstand of the general type disclosed in my aforementioned patent and pending application, to which reference is made for a full disclosure thereof. The present invention is concerned with the delivery end of such a checkstand, this end of the stand including a frame or base 10, and a cross-member 11 in the form of a guard rail is arranged across the delivery end 12 of the checkstand.

The articles to be checked are placed on a loading platform which is shown fully in my aforementioned patent and copending, and as they are checked and their prices tallied, they are placed upon a conveyor belt 15. The belt conveys the articles to the delivery end 12 of the checkstand where they are diverted laterally onto either of two sacking platforms 16 or 17, depending upon the angular position in which a divider bar or arm 18 has been set. The arm 18 has its outer end connected by means of a pin 19 to the upper polygonal end 20 of a vertical swivel shaft 21 which is pivotally mounted in a vertical hole provided in a movable table section 23.

As shown in Fig. 2, the movable table section 23 bridges the space between the sacking platforms 16 and 17. The movable section rests upon inwardly directed plates 24 and 25 secured against the bottom surfaces of the platforms. By this construction, the table section 23 is mounted for forward and rearward sliding movement, that is, longitudinally of the conveyor belt 15. It is to be noted that the belt 15 extends around a pulley or roller 25 which is carried by a shaft 26 disposed transversely of the checkstand and adjacent the delivery end thereof.

The pulley shaft 26 is rotatable in spaced bearing members 28 which are fastened to angle-irons 29 by means of front and rear bolts 30 and 31 respectively. The inner ends of the angle-irons 29 are secured to support blocks 33 mounted upon the base 10 by suitable means that are not shown. The forward end of each angle-iron 29 has a bent flange 35 provided with a hole through which extends the shank of an adjusting screw 36. The inner or rearward end of each screw 36 is threaded through a tapped hole in the depending head 37 of one of the mounting bolts 30, previously referred to.

It is to be noted that the bolts 30 and 31 extend downwardly through longitudinally extending elongated slots 38 in the upper horizontal flanges of the angle-irons 29. Consequently, when the adjusting screws 36 are rotated, the bearing members 28 are slid forwardly or rearwardly, depending upon the direction of rotation of the screws. By this means, the pulley or roller 25 may readily be moved forwardly so as to tighten the conveyor belt 15 and thus compensate for any stretching that has occurred during use.

Interposed between the bearing members 28 and the top flanges or arms of the angle-irons 29 are the lower leg portions 41 of angular brackets 42. The bolts 30 and 31 extend through holes in these leg portions. The brackets 42 have vertical webs 43 and forwardly-directed flanges or fingers 44. Secured to the flanges 44 by screws 45 are the ends of a bar 46 which extends transversely of the checkstand at a position forward of the pulley 25.

The transverse bar 46 has an aperture at its midportion through which extends a bolt 49. The bolt is employed to secure a combined stop and adjusting member 50 in place against the upper surface of the bar 46. The stop member 50 is in the form of an eccentric disc, having an offset hole through which the bolt 49 extends. The upper head portion of the bolt engages the upper surface of the disc and the lower threaded end of the bolt 49 projects below the bar 46 to receive a nut 52 which is screwed onto this end and sets up against the bar to clamp the disc securely against the bar.

As shown in Figs. 1 and 3, the underside of the movable table section 23 is provided with a square-ended recess 55 for receiving the stop disc 50. A coil spring 56 has its upper end fastened to the bottom of the table section 23 by means of a flat headed stove bolt 69 and its other end is hooked through a ring 57a linked to an eye bolt 57 fastened to a block 58 mounted on the base 10. The spring 56 thus is tensioned between the stationary eye 57 and the movable table section 23 and functions to slide the table section toward the pulley 25 to maintain the inner end or shoulder 60 of the recess 55 seated against the stop disc 50. As shown in Fig. 1, the inner end 62 of the movable table section 23 is curved to adapt it to follow the arcuate contour of the upper portion of the belt 15 as the latter travels around the pulley 25. The curved end 62 of the table section 23 normally is maintained at a slight distance from the belt by means of the stop member 50, thus establishing a small gap 63 between the end 62 and the belt 15.

Assuming that the parts have been adjusted to the relative positions as shown in Fig. 1, the checkstand is operated in the manner explained in my aforementioned patent and copending application. In this operation, the customer places the grocery items or other articles successively upon the conveyor 15, and the cashier tallies them as they are carried past the checking station. The items thus are conveyed successively to the delivery station where they are diverted onto either of the sacking platforms 16 or 17 by the pivotally adjustable arm 18. The articles, upon being delivered to the platform 16 or 17, are placed in bags, boxes or other containers in the usual manner.

As explained above, the movable table section 23 is drawn toward the pulley 25 to maintain the predetermined clearance gap 63 between the inner end of the table section and the curved portion of the belt 15 under the action of the spring 56, the shoulder 60 of the recess 55 engaging the stop disc 50 to limit the sliding movement of the table section. As will be apparent, it is desirable that the gap 63 be maintained as narrow as possible. To adjust the gap, the table section 23 is lifted to obtain access to the bolt 49 and nut 52 which are then simply loosened, and the eccentric disc 50 is rotated to the desired position. The bolt and nut are again tightened to clamp the disc in its adjusted position. It will be noted that the recess 55 is sufficiently wide to permit the eccentric disc to rotate therein without displacing the table section 23 laterally.

During operation of the conveyor belt 15, should any relatively thick object inadvertently enter the gap 63 and tend to wedge between the belt 15 and the table section 23, the latter is forced away from the belt, against the action of the spring 56, increasing the clearance gap 63 momentarily to allow the object to pass downwardly onto the base 10.

During operation of the checkstand, it frequently occurs that loose material, such as sugar, flour, salt, etc., escapes from the containers in which the material is packed and adheres to the conveyor belt 15 in thin layers. When this condition prevails, the material may pass through the clearance gap 63. Now, since the adjusted position of the movable table section 23 is dependent upon the setting of the stop disc 50, which is fixed relative to the belt 15, it follows that the setting of the table section relative to the belt is undisturbed by the presence of such material on the belt. Likewise, any relatively thin object, such as portions of lettuce leaves, may pass through the clearance gap without causing it to be enlarged. It is thus seen that the present invention constitutes an important improvement over my prior checkstand structures wherein a roller carried by the table section engages the curved portion of the belt to establish the clearance gap, it having been determined that increase in the effective thickness of the belt at the position of the roller, due to the presence of loose material thereon, may shift the roller and the table section away from the axis of the belt pulley and thus unduly increase the width of the clearance gap.

As is well known, conveyor belts of this type are subject to stretching. To compensate for such elongation of the belt 15, the adjusting screws 36 are rotated to draw the bearings 28, shaft 26 and pulley 25 toward the right, as viewed in Fig. 1, so as to tighten the belt. It is to be particularly noted that the stop member 50 and its supporting bracket 42 are fixed with respect to the pulley and thus are moved therewith. Consequently, the curved end 62 of the movable table section 23 is maintained always at the initially adjusted distance from the belt.

Although only one particular embodiment of the invention has been specifically disclosed herein, it will be obvious that the invention is not limited thereto but is capable of a variety of mechanical embodiments. Various changes which will now suggest themselves to those skilled in the art may therefore be made in the material, form, details of construction and arrangement of the elements without departing from the principles of my invention.

I claim as my invention:

1. In a conveyor system having a stationary support and a pulley adapted to guide a conveyor belt: a table section adapted to receive objects conveyed by the conveyor belt, said section being movable toward and away from said pulley longitudinally of the belt, an end of said section being disposed in proximity to a curved portion of the belt extending around the pulley; adjusting means fixedly mounted with respect to the axis of the pulley and engageable with said table section for adjusting said section toward and away from said curved portion of the belt; and means for adjusting the position of said pulley relative to said support along the axis of movement of said belt toward said section without shifting the normal relative positions of said section and said curved portion of said belt.

2. In a conveyor system having a stationary support and a pulley adapted to guide a conveyor belt: a table section adapted to receive objects conveyed by the conveyor belt, said section being movable toward and away from said pulley longitudinally of the belt, an end of said section being disposed in proximity to a curved portion of the belt extending around the pulley; rotatable adjusting means fixedly mounted with respect to the axis of the pulley and engageable with said table section for adjusting said section toward and away from said curved portion of the belt; and means for adjusting the position of said pulley relative to said support along the axis of movement of said belt toward said section without shifting the normal relative positions of said section and said curved portion of said belt.

3. In a conveyor system having a stationary support and a pulley adapted to guide a conveyor belt: a table section adapted to receive objects conveyed by the conveyor belt, said section being movable toward and away from said pulley longitudinally of the belt, an end of said section being disposed in proximity to a curved portion of the belt extending around the pulley; rotatable eccentric adjusting means fixedly mounted with respect to the axis of the pulley and engageable with said table section for adjusting said section toward and away from said curved portion of the belt; and means for adjusting the position of said pulley relative to said support along the axis of movement of said belt toward said section without shifting the normal relative positions of said section and said curved portion of said belt.

4. In a conveyor system having a stationary support and a pulley adapted to guide a conveyor belt: a table section adapted to receive objects conveyed by the conveyor belt, said section being movable toward and away from said pulley longitudinally of the belt, an end of said section being disposed in proximity to a curved portion of the belt extending around the pulley; adjusting means fixedly mounted with respect to the axis of the pulley and engageable with said table section for adjusting said section toward and away from said curved portion of the belt; spring means connected between said support and said table section and operative to maintain the section in engagement with said adjusting means; and means for adjusting the position of said pulley relative to said support along the axis of movement of said belt toward said section without shifting the normal relative positions of said section and said curved portion of said belt.

5. In a conveyor system having a stationary support and a pulley adapted to guide a conveyor belt: a table section adapted to receive objects conveyed by the conveyor belt, said section being movable toward and away from said pulley longitudinally of the belt, an end of said section being disposed in proximity to a curved portion of the belt extending around the pulley, said section having a shoulder; adjusting means fixedly mounted with respect to the axis of the pulley and engageable with said table section for adjusting said section toward and away from said curved portion of the belt; spring means connected between said support and said table section and operative to maintain the shoulder in engagement with said adjusting means; and means for adjusting the position of said pulley relative to said support along the axis of movement of said belt toward said section without shifting the normal relative positions of said section and said curved portion of said belt.

6. A conveyor system, including: a stationary support; bearing means adjustably mounted on said support; a pulley rotatably supported by said bearing means; a conveyor belt extending around said pulley; a table section disposed in the plane of the belt and having an end located in proximity to the curved portion of the belt extending around the pulley, said section being adapted to receive objects from said belt; mounting means mounting said section for movement toward and away from said curved portion of the belt; spring means operative to move said section toward the pulley; and adjustable stop means fixedly mounted relative to said bearing means and engageable with said table section to limit movement of the section toward the pulley.

7. A conveyor system, including: a stationary support; bearing means adjustably mounted on said support; a pulley rotatably supported by said bearing means; a conveyor belt extending around said pulley; a table section disposed in the plane of the belt and having an end located in proximity to the curved portion of the belt extending around the pulley, said section being adapted to receive objects from said belt, said section having a recess in the lower surface thereof defining a shoulder; mounting means mounting said section for movement toward and away from said curved portion of the belt; spring means operative to move said section toward the pulley; and adjustable stop means fixedly mounted relative to said bearing means and disposed in said recess, said stop means being engageable with said shoulder to limit movement of the section toward the pulley.

8. A conveyor system, including: a stationary support; bearing means adjustably mounted on said support; a pulley rotatably supported by said bearing means; a conveyor belt extending around said pulley; a table section disposed in the plane of the belt and having an end located in proximity to the curved portion of the belt extending around the pulley, said section being adapted to receive objects from said belt, said section having a recess in its lower surface defining a shoulder; mounting means mounting said section for movement toward and away from said curved portion of the belt; spring means tensioned between said support and said table section and operative to move the section toward the pulley; a bracket means fixedly secured to said bearing means so as to be adjustable therewith, said bracket means having a bar extending substantially parallel to said pulley and beneath said table section; an eccentric disc on said bar disposed in said recess and engageable with said shoulder so as to limit movement of said table section toward said pulley; and a clamping bolt means on said bar and operative to retain said disc in selected positions of rotary adjustment.

9. A conveyor system, including: a stationary support; bearing means adjustably mounted on said support; a pulley rotatably supported by said bearing means; a flat conveyor belt extending around said pulley; a table section disposed in the plane of the belt and having an end located in proximity to the curved portion of the belt extending around the pulley, said end being shaped in a manner complementary to the curvature of the curved portion of said belt, said section being adapted to receive objects from said belt; mounting means mounting said section for movement toward and away from said curved portion of the belt; spring means operative to move said section toward the pulley; and adjustable stop means fixedly mounted relative to said bearing means and engageable with said table section to limit movement of the section toward the pulley.

References Cited in the file of this patent
UNITED STATES PATENTS

| | | |
|---|---|---|
| 380,400 | Menke | Apr. 3, 1888 |
| 2,030,103 | Dunlop | Feb. 11, 1936 |